(12) United States Patent
Forsythe

(10) Patent No.: US 12,131,385 B2
(45) Date of Patent: *Oct. 29, 2024

(54) STRATEGY-BASED EXIT PLANNING FOR A TRADING SYSTEM

(71) Applicant: Morgan Stanley Services Group Inc., New York, NY (US)

(72) Inventor: Aric Forsythe, Chicago, IL (US)

(73) Assignee: Morgan Stanley Services Group Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/874,470

(22) Filed: Jul. 27, 2022

(65) Prior Publication Data

US 2022/0366503 A1 Nov. 17, 2022

Related U.S. Application Data

(63) Continuation of application No. 16/993,890, filed on Aug. 14, 2020, now Pat. No. 11,430,067, which is a continuation of application No. 16/184,131, filed on Nov. 8, 2018, now Pat. No. 10,776,874, which is a continuation of application No. 12/586,287, filed on Sep. 18, 2009, now Pat. No. 10,169,819.

(60) Provisional application No. 61/192,890, filed on Sep. 22, 2008.

(51) Int. Cl.
*G06Q 40/06* (2012.01)
*G06Q 40/00* (2023.01)
*G06Q 40/04* (2012.01)

(52) U.S. Cl.
CPC ............ *G06Q 40/06* (2013.01); *G06Q 40/00* (2013.01); *G06Q 40/04* (2013.01)

(58) Field of Classification Search
CPC ......... G06Q 40/06; G06Q 40/00; G06Q 40/04
See application file for complete search history.

(56) References Cited

U.S. PATENT DOCUMENTS

| 7,379,909 B1* | 5/2008 | Cruz ................ G06Q 40/00 |
| 7,483,849 B2* | 1/2009 | Voudrie ............ G06Q 40/12 |
| | | 705/30 |
| 7,720,759 B2 | 5/2010 | Fine et al. |

(Continued)

FOREIGN PATENT DOCUMENTS

| WO | 0075836 A2 | 12/2000 | |
| WO | WO-03065254 A1 * | 8/2003 | ............ G06Q 40/02 |
| WO | WO-2004008363 A1 * | 1/2004 | ............ G06Q 40/06 |

OTHER PUBLICATIONS

Lim, Paul J.: Before jumping in, look for your exit—An investment plan should include a strategy for when to sell, Jun. 1, 2004, International Herald Tribune 13, Paris: International New York Times, pp. 1-2 (Year: 2004).*

(Continued)

*Primary Examiner* — Bijendra K Shrestha
(74) *Attorney, Agent, or Firm* — Lempia Summerfield Katz LLC

(57) ABSTRACT

A system for strategy-based exit planning comprises a processor and a memory. The processor is configured to receive an indication to create an exit plan; and create an exit plan for a strategy, wherein the strategy comprises one or more instruments. The memory is coupled to the processor and configured to provide the processor with instructions.

21 Claims, 16 Drawing Sheets

(56) References Cited

U.S. PATENT DOCUMENTS

| | | | |
|---|---|---|---|
| 7,827,090 B2* | 11/2010 | Thompson | G06Q 40/04 705/37 |
| 2002/0042771 A1* | 4/2002 | Shields | G06Q 40/06 705/37 |
| 2002/0087450 A1 | 7/2002 | Reddy | |
| 2003/0115207 A1 | 6/2003 | Bowman et al. | |
| 2003/0208407 A1* | 11/2003 | Dawson | G06Q 30/0601 705/26.1 |
| 2004/0039716 A1* | 2/2004 | Thompson | G06F 8/36 706/13 |
| 2005/0283427 A1* | 12/2005 | Owens | G06Q 40/04 705/37 |
| 2006/0010056 A1 | 1/2006 | De La Motte | |
| 2006/0155632 A1 | 7/2006 | Cherkas et al. | |
| 2006/0265311 A1* | 11/2006 | Dean | G06Q 40/06 705/37 |
| 2007/0118466 A1* | 5/2007 | Worlikar | G06Q 40/04 705/37 |
| 2007/0156565 A1* | 7/2007 | Singer | G06Q 40/04 705/37 |
| 2009/0204532 A1 | 8/2009 | Radle et al. | |
| 2009/0265263 A1* | 10/2009 | Williams | G06Q 40/06 705/37 |

OTHER PUBLICATIONS

OptionPundit: Put Diagonal Spread—An Income Strategy to Play Downward Move, Sep. 11, 2008, pp. 1-5 (Year: 2008).*

CQG Inc.: Trading with CQG Integrated Client, version 7.7, Apr. 29, 2008, pp. 1-155 (Year: 2008).*

Lim, Paul J.,: Before jumping in, look for your exit: An investment plan should include a strategy for when to sell, Jun. 1, 2004, International Herald Tribune: 13, Paris, pp. 1-2 (Year: 2004).*

COG: Trading with COG Integrated Client, Version 7.7, Apr. 29, 2008, pp. 1-155 (Year: 2008).

OptionPundit: Put Diagonal Spread—An Income Strategy to Play Downward Move, Sep. 11, 2008, pp. 1-5.

OptionPundit: Vertical Credit Spread: A Beautiful Strategy for the Income Traders, Jan. 29, 2007. pp. 1-8.

Paul J. Lim, "Befor e Jumping in, Look for your Exit: An Investment Plan Should Include a Strategy for when to Sell", International Herald Tribune, 13, Jun. 1, 2004, 2 pages, Paris.

Shinder, Littlejohn D.: SolutionBase: Monitoring, logging and reporting with ISA Server 2004, Jan. 26, 2004, TechRepublic, pp. 1-24 (Year: 2004).

* cited by examiner

STRATEGY-BASED EXIT PLANNING FOR A TRADING SYSTEM

RELATED APPLICATIONS

This application is a continuation under 37 C.F.R. § 1.53(b) of U.S. patent application Ser. No. 16/993,890 filed Aug. 14, 2020, entitled STRATEGY-BASED EXIT PLANNING FOR A TRADING SYSTEM," now U.S. Pat. No. 11,430,067, which is a continuation of U.S. patent application Ser. No. 16/184,131 filed Nov. 8, 2018, entitled "STRATEGY-BASED EXIT PLANNING FOR A TRADING SYSTEM," now U.S. Pat. No. 10,776,874, which is a continuation of U.S. patent application Ser. No. 12/586,287 filed Sep. 18, 2009, entitled "STRATEGY-BASED EXIT PLANNING FOR A TRADING SYSTEM," now U.S. Pat. No. 10,169,819, which claims priority to U.S. Provisional Patent Application No. 61/192,890 entitled STRATEGY-BASED EXIT PLANNING FOR A TRADING SYSTEM filed Sep. 22, 2008, the entire disclosures of which are incorporated by reference in their entirety.

BACKGROUND

Often option trades are put on as strategies involving multiple option contracts but after the trade fills they exist in an account only as individual instruments. Setting exit plans on individual instruments does not make sense if those positions were initiated as multi-leg strategies, so often exit planning is not done for these option positions.

BRIEF DESCRIPTION OF THE DRAWINGS

Various embodiments of the invention are disclosed in the following detailed description and the accompanying drawings.

DETAILED DESCRIPTION

Figure 1:
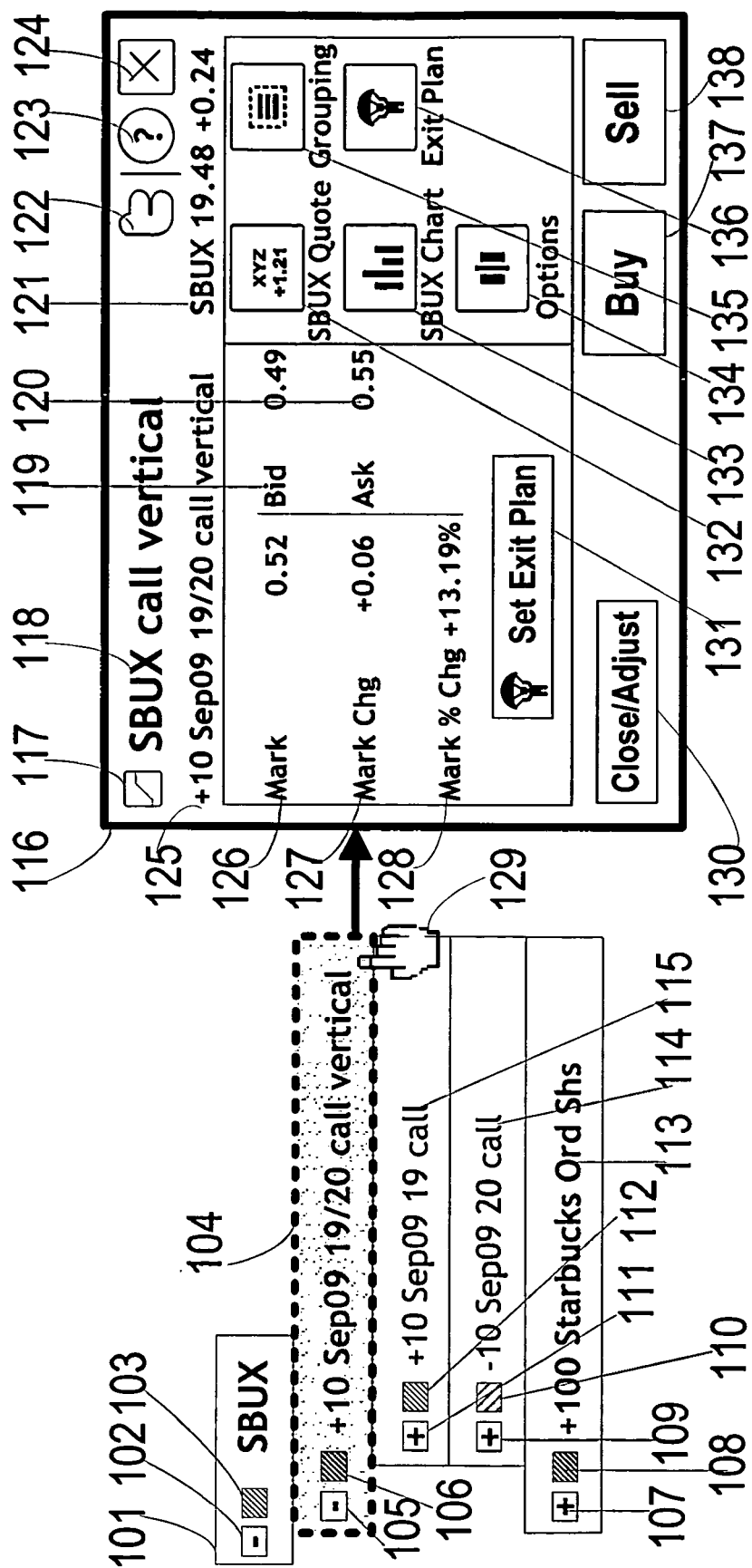
FIG. 1 is a screen shot illustrating an embodiment of an Action Menu for a strategy from which the user can launch Strategy-based Exit Planning using the Set Exit Plan button.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Strategy-based exit planning for a trading application is disclosed. An indication is received to create an exit plan. An exit plan is created for a strategy. The strategy comprises one or more instruments. In various embodiments, a strategy includes one or more of the following: call option contract(s), put option contract(s), stock, mutual fund(s), future(s), exchange traded fund(s), or any other appropriate instrument. In various embodiments, an exit plan includes one or more of the following: a profit target, a stop loss, an expire date, an expire time, or any other appropriate exit plan parameter. In various embodiments, a profit target or a stop loss is set using a calculator, which allows for specifying a value of either the target price level, the change from the price paid, the percentage change from the price paid or the desired gain or maximum allowed loss. Once any one of those values is specified the calculator automatically calculates the other three values and displays them.

Options can be traded as single instruments, but often they are traded in strategies that involve more than one option or an option in conjunction with the underlying security. Most standard strategies that are popular in the industry have one, two, three or four or another number of instruments of either various option contracts or the underlying as part of the strategy. A strategy-based exit plan enables a user to specify an exit plan based on a given strategy. This enables the user to achieve an important discipline with a series of simple clicks.

In some embodiments, strategy-based exit planning is executed by first clicking a position strategy to get an Action Menu, then on the menu click the button for "Set Exit Plan." A dialog will pop up for setting the time horizon, profit target and stop loss for the strategy.

Figure 2:
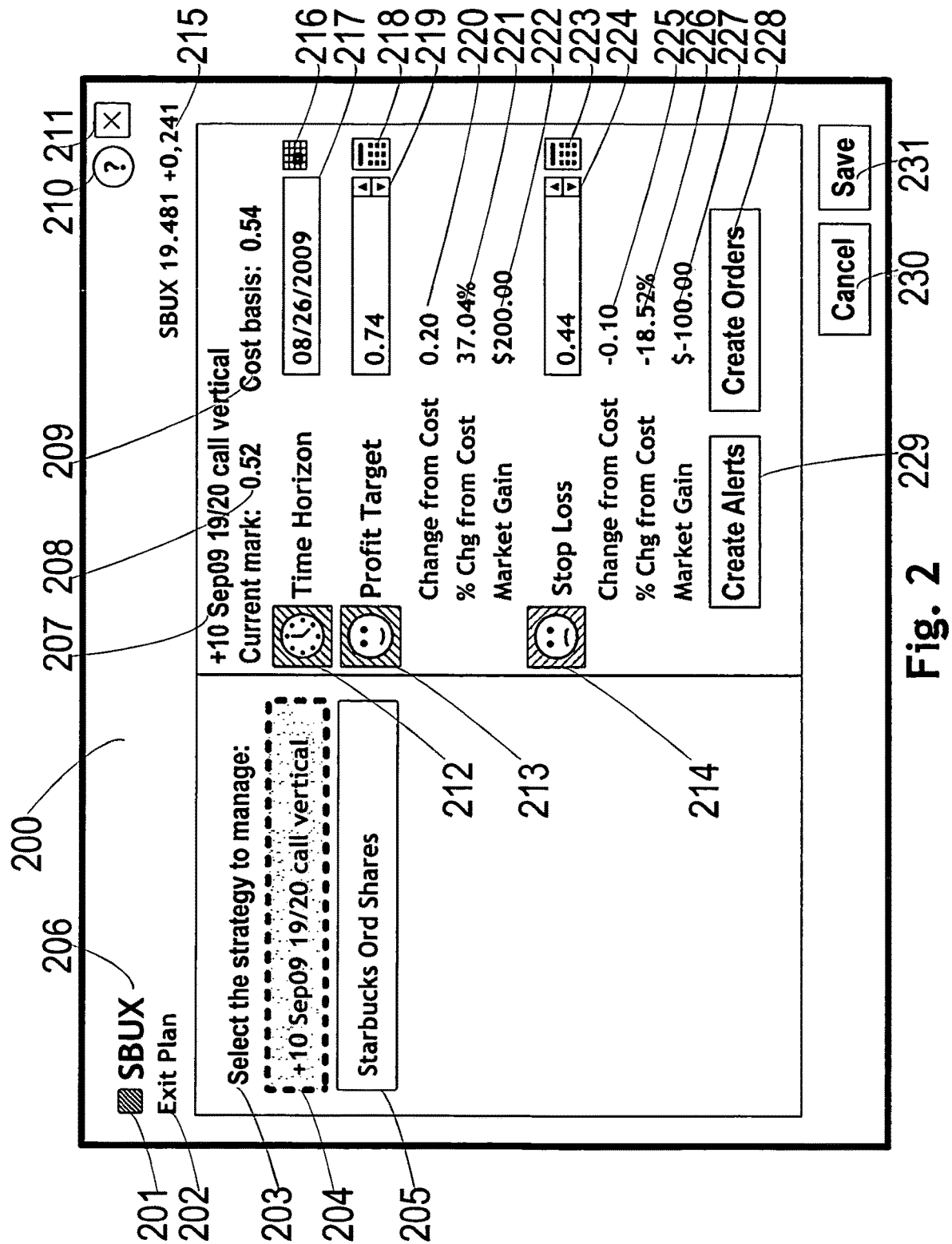
FIG. 2 is a screen shot illustrating an embodiment of the Strategy-based Exit Plan dialog where the user can specify the details for the strategy-based exit plan.

FIG. 1 is a screen shot illustrating an embodiment of a Position List containing strategies and an Action Menu for a "call vertical" strategy from which the user can launch Strategy-based Exit Planning using the Set Exit Plan button. In the example shown, line item 101 comprises a line item in a position list for all holdings for the Starbucks stock underlying, symbol SBUX. Button 102 enables a user to display the positions where the underlying is Starbucks stock. Color indicator 103 indicates how much the aggregated positions for the SBUX underlying are up or down on the day. Position 104 comprises two instruments where the strategy type is a call vertical. Button 105 enables a user to display the component instruments for the call vertical strategy. Color indicator 106 indicates how much the call vertical is up or down on the day. Button 107 enables a user to see detailed information regarding the strategy that comprises Starbucks stock. Color indicator 108 indicates how much the Starbucks stock strategy is up or down on the day. Button 109 enables a user to view detailed information for the Sep09 20 call instrument. Color indicator 110 indicates how much the Sep09 20 call is up or down on the day. Button 111 enables a user to view detailed information for the Sep09 19 call instrument. Color indicator 112 indicates how much the Sep09 19 call is up or down on the day. Description of the strategy 113 describes the strategy, which in this case comprises Starbucks shares. Description 114 describes short 10 contracts of the Starbucks September, 2009 20 strike call option position. Description 115 describes the long 10 contracts of the Starbucks September, 2009 19 strike call option position. Action Menu 116 is invoked by clicking on the vertical call strategy (indicator 104) in the Positions List. Risk profile and color indicator 117 indicates how much the strategy is up or down on the day. Name 118 indicates the name of the strategy for Action Menu 116. Bid 119 indicates the quoted bid price for this strategy. Ask 120 indicates the quoted ask price for this strategy. Quote 121 indicates the quote for the underlying Starbucks (symbol SBUX) stock. Button 122 enables a user to share information or comments about this strategy via the social networking site Twitter. Button 123 enables a user to access help for this Action Menu. Button 124 enables a user to close the Action Menu without any action being taken. Description 125 indicates the description of the strategy, where "+10" indicates the quantity of the strategy, "Sep09" indicates the expiration of the strategy, "19/20" indicates the strike prices of the strategy and "call vertical" indicates the type of strategy. Mark 126 indicates the mark price of the strategy, which is the midpoint of the bid and ask prices in the market. Mark change 127 is the mark change for this strategy, which is the difference in price between the mark price of the strategy and the prior closing price. Mark percentage change 128 indicates the mark percentage change (e.g., the mark change expressed as a percentage of the prior closing price) for this strategy. Cursor 129 indicates the user's cursor clicking on the strategy to invoke the Action Menu. Button 130 enables a user to create an order to close the strategy or adjust the strategy, which involves making a trade that changes the expiration or strike characteristics of the strategy. Button 131 enables a user to invoke the Exit Plan dialog from which the user can set the Exit Plan. The Exit Plan dialog is shown in FIG. 2. Button 132 enables a user to get quote information on Starbucks (symbol SBUX) stock. Button 133 enables a user to get a price chart of Starbucks (symbol SBUX) stock. Button 134 enables a user to view an option chain for Starbucks, which is a formatted table of the various option contracts that trade for Starbucks. Button 135 enables a user to change the way instruments are grouped to form strategies for this underlying (the underlying being Starbucks stock). Button 136 enables a user to invoke the Exit Plan dialog. Button 136 has the same functionality as the button 131. Button 137 enables a user to buy the strategy. Button 138 enables a user to sell the strategy.

Figure 3:
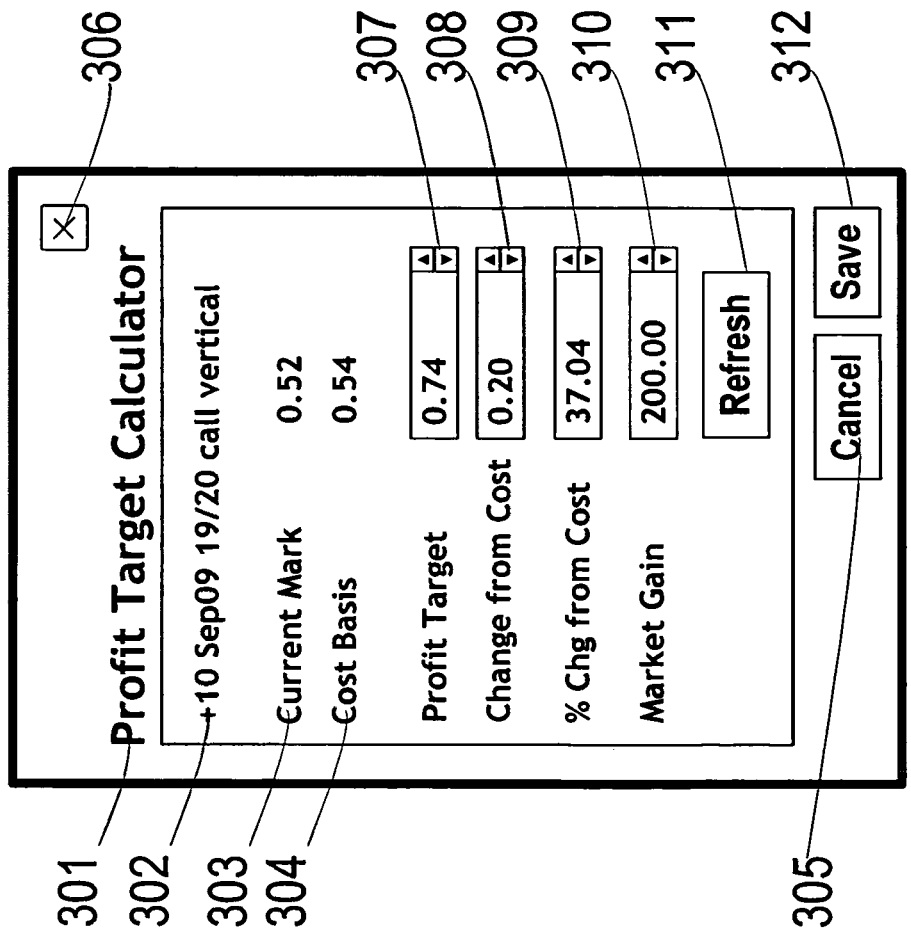
FIG. 3 is a screen shot illustrating an embodiment of the Profit Target Calculator from which the user can specify a profit target in one of four ways.
Figure 4:
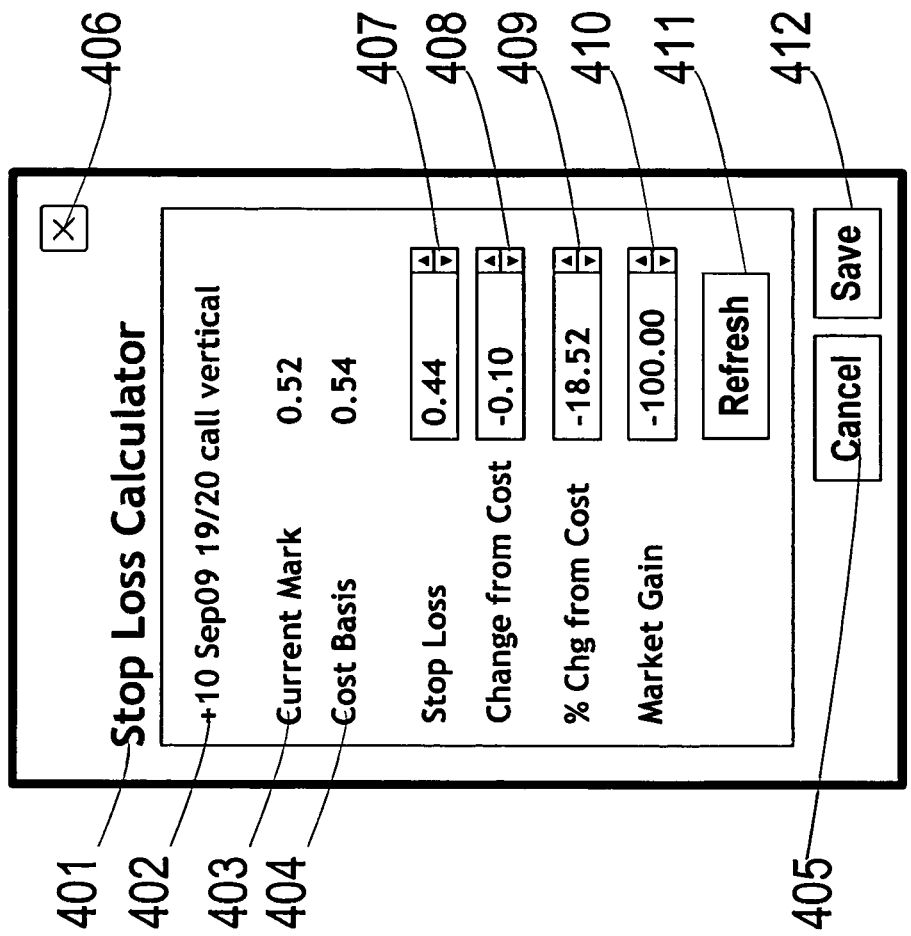
FIG. 4 is a screen shot illustrating an embodiment of the Stop Loss Calculator from which the user can specify a stop loss in one of four ways.
Figure 5:
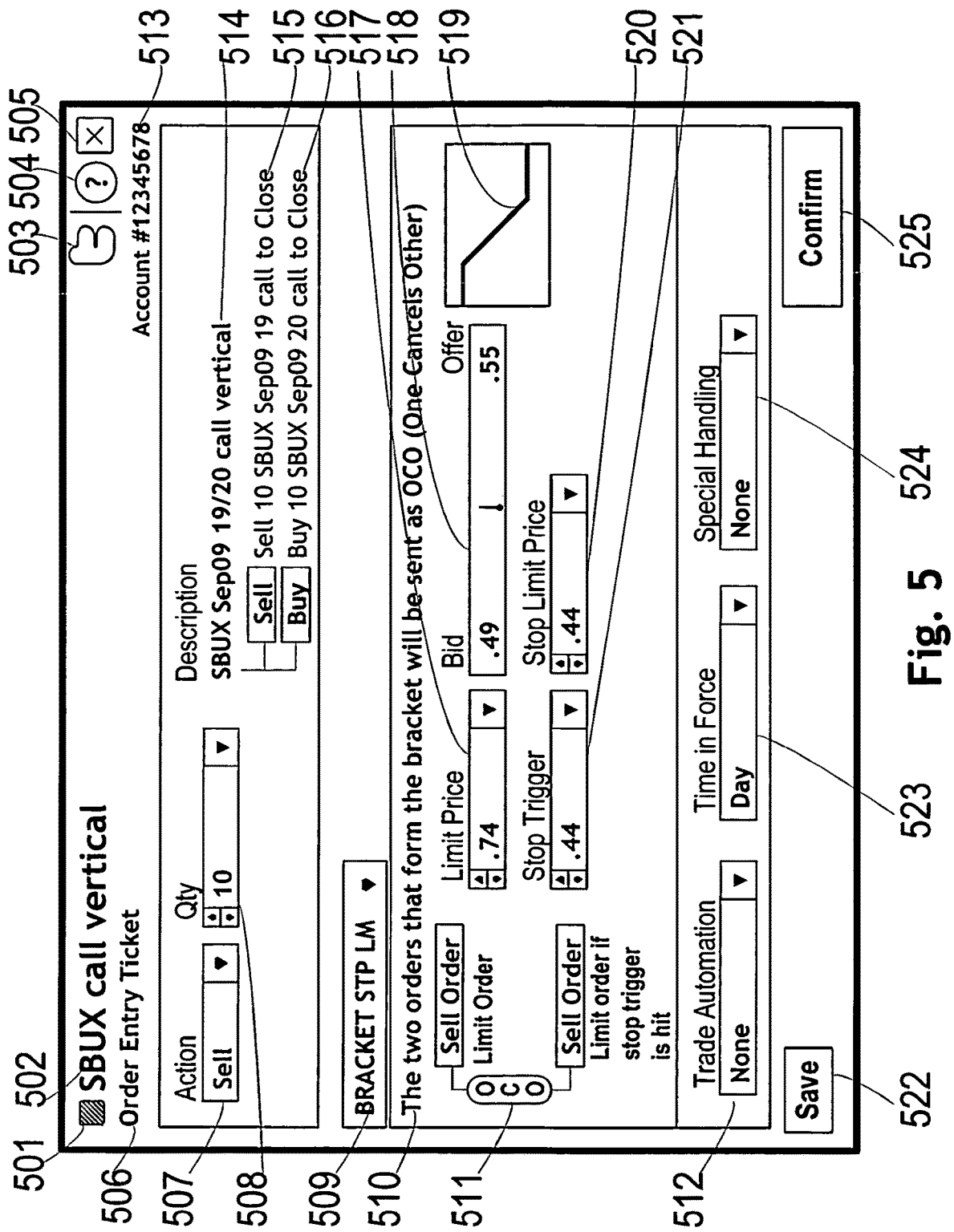
FIG. 5 is a screen shot illustrating an embodiment of an order entry ticket created from the Strategy-based Exit Plan dialog where the order ticket contains a two-part "bracket" order consisting of an order to exit the position if the profit target criterion is satisfied and an order to exit the position if the stop loss criterion is satisfied.
Figure 6:
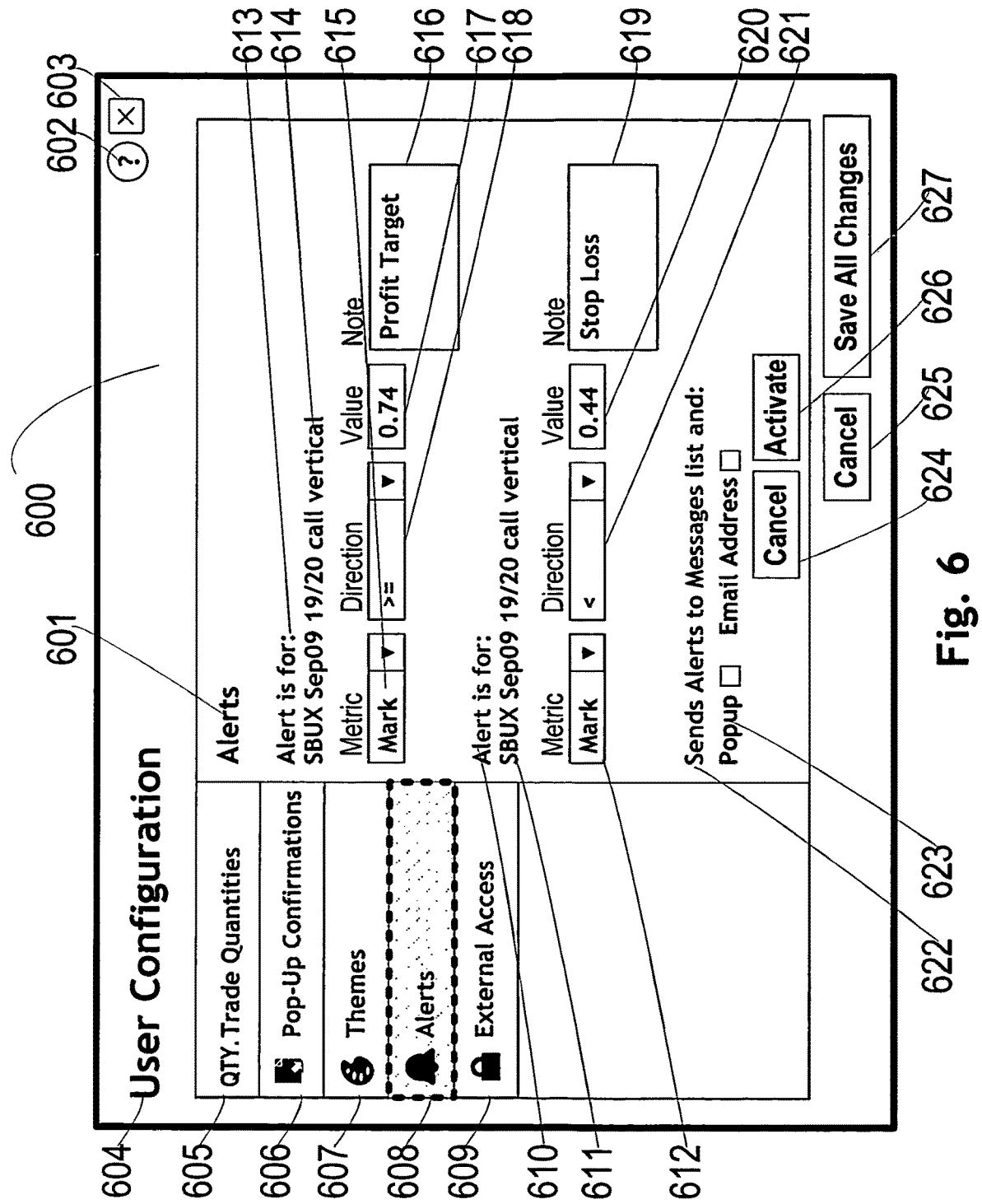
FIG. 6 is a screen shot illustrating an embodiment of a dialog for setting alerts which is created from the Strategy-based Exit Plan dialog. The dialog will set two alerts, one if the profit target criterion is satisfied and one if the stop loss criterion is satisfied.

FIG. 2 is a screen shot illustrating an embodiment of the Strategy-based Exit Plan dialog where the user can specify the details for the Strategy-based Exit Plan. In the example shown, Exit Plan dialog 200 is shown in which the user specifies the three components of the Exit Plan for the strategy: the time horizon, the profit target, and the stop loss. Exit Plan dialog 200 appears after the user clicks a button (e.g., the "Specify Exit Plan" button such as button 131 of FIG. 1 or the Exit Plan button such as button 136 of FIG. 1). Color indicator 201 indicates how much the underlying instrument, in this example Starbucks stock (symbol SBUX) is up or down on the day. Title 202 indicates the title of exit plan dialog 200. Text 203 indicates the instructions to pick a strategy to manage. Strategy 204 comprises a selected strategy which is a call vertical (a strategy that consists of two instruments) where "+10" indicates the quantity held, "Sep09" indicates the expiration of the strategy, "19/20" indicates the strike prices of the strategy and "call vertical" indicates the type of strategy. Strategy 205 comprises another held strategy, in this case the strategy is simply Starbucks stock. Symbol 206 indicates the underlying symbol. Description 207 indicates the description of the strategy. Mark 208 indicates current mark price of the strategy, which is the midpoint of the bid and ask prices in the market. Cost Basis 209 indicates the cost basis, or the amount the user paid, for the strategy. Button 210 enables a user to access help for the Exit Plan dialog. Button 211 enables a user to close the Exit Plan dialog without taking action. Icon 212 comprises an illustrative icon indicating the time horizon portion of the exit plan. Icon 213 comprises an illustrative icon indicating the profit target portion of the exit plan. Icon 214 comprises an illustrative icon indicating the stop loss portion of the exit plan. Quote 215 indicates a quote for the underlying instrument for the strategy, in this example Starbucks stock (symbol SBUX). Button 216 enables a user to access a calendar for choosing a date for the time horizon. Data entry box 217 enables a user to enter the time horizon part of the exit plan. Button 218 enables a user to invoke the Profit Target Calculator which enables several ways for the user to enter the profit target. Details for the Profit Target Calculator are shown in FIG. 3. Data entry box 219 enables a user to enter the value of the profit target. Change from cost 220 is the difference between the profit target and the cost basis (the cost basis is what the user paid for the strategy). Percentage change from cost 221 is the percentage difference between the profit target and the cost basis. Market gain 222 is the profit or loss that results from achieving the profit target. Button 223 enables a user to invoke the Stop Loss Calculator which enables several ways for the user to enter the stop loss. Details for the Stop Loss Calculator are shown in FIG. 4. Data entry box 224 enables a user to enter the value of the stop loss. Change from cost 225 is the difference between the stop loss and the cost basis (the cost basis is what the user paid for the strategy). Percentage change from cost 226 is the percentage difference between the stop loss and the cost basis. Market gain 227 is the profit or loss that results from achieving the stop loss. Create Orders button 228 enables a user to cause an order to be created that executes the Exit Plan. The order entry ticket that gets created is shown in FIG. 5. Create Alerts button 229 enables a user to cause a set of alerts to be created that notify the user if the profit target or stop loss criteria are satisfied. The alerts dialog that gets pre-filled is shown in FIG. 6. Cancel button 230 enables a user to close the Exit Plan dialog without action being taken. Button 231 enables a user to save the Exit Plan and close the Exit Plan dialog.

FIG. 3 is a screen shot illustrating an embodiment of the Profit Target Calculator from which the user can specify a profit target in one of four ways using one of four data entry values. In the example shown, whichever value the user specifies for the profit target, the other three values consistent with the entered value will be calculated for reference purposes. Title 301 is the title of the Profit Target Calculator dialog. Description 302 indicates the description of the strategy that makes up the position, where "+10" indicates the quantity, "Sep09" indicates the position expiration date, "19/20" indicates the strike prices of the strategy and "call vertical" indicates the name of the strategy. Mark 303 indicates the current mark of the strategy, which is the midpoint of the bid and ask prices in the market. Cost basis 304 indicates the cost basis of the strategy which is the price the user paid for the strategy. Button 305 comprises a Cancel button which enables a user to close the dialog without taking any action. Button 306 comprises a close button which enables a user to close the dialog without taking any action. Box 307 comprises a box that displays a profit target or enables a user to enter a profit target, which is the price level of the strategy at which the user would like to exit the position. Box 308 comprises a box that displays a change from cost or enables a user to enter a change from cost, which is the difference in price from the cost basis at which the user would like to exit the position. Box 309 comprises a box that displays a percentage change from cost or enables a user to enter a percentage change from cost, which is the percentage difference in price from the cost basis at which the user would like to exit the position. Box 310 comprises a box that displays a market gain or enables a user to enter a market gain which is the amount of profit or loss at which the user would like to exit the position. Button 311 comprises a refresh button which, when selected by a user, recalculates the values for profit target, change from cost, percentage change from cost and market gain if any one of those values is changed. Button 312 comprises a save button which, when selected by a user, causes the profit target to be entered into the Exit Plan.

FIG. 4 is a screen shot illustrating an embodiment of the Stop Loss Calculator from which the user can specify a stop loss in one of four ways using one of four data entry values. In the example shown, whichever value the user specifies for the stop loss, the other three values consistent with the entered value will be calculated for reference purposes. Title 401 is the title of the Stop Loss Calculator dialog. Description 402 indicates the description of the strategy that makes up the position, where "+10" indicates the quantity, "Sep09" indicates the position expiration date, "19/20" indicates the strike prices of the strategy and "call vertical" indicates the name of the strategy. Mark 403 indicates the current mark of the strategy, which is the midpoint of the bid and ask prices in the market. Cost basis 404 indicates the cost basis of the strategy which is the price the user paid for the strategy. Button 405 comprises a Cancel button which can be clicked to close the dialog without taking any action. Button 406 comprises a close button which can be clicked to close the dialog without taking any action. Box 407 is a box that displays a stop loss or enables a user to enter a stop loss, which is the price level of the strategy at which the user would like to exit the position. Box 408 is a box that displays a change from cost or enables a user to enter a change from cost, which is the difference in price from the cost basis at which the user would like to exit the position. Box 409 is a box that displays a percentage from cost or enables a user to enter a percentage change from cost, which is the percentage difference in price from the cost basis at which the user would like to exit the position. Box 410 is a box that displays a market gain or enables a user to enter a market gain which is the amount of profit or loss at which the user would like to exit the position. Button 411 comprises a refresh button which can be clicked to recalculate the values for stop loss, change from cost, and percentage change from cost and market gain if any one of those values is changed. Button 412 comprises a save button which will cause the stop loss to be entered into the Exit Plan.

FIG. 5 is a screen shot illustrating an embodiment of an order entry ticket created from the Strategy-based Exit Plan dialog where the order ticket contains a two-part "bracket" order comprising an order to exit the position if the profit target criterion is satisfied and an order to exit the position if the stop loss criterion is satisfied. In the example shown, as soon as one criterion is satisfied, the order based on the other criterion is canceled. Icon 501 comprises a color indicator which shows how much the strategy is up or down for the day. Name 502 indicates the name of the strategy. Button 503 for sharing information or comments on this strategy via the social networking site Twitter. Button 504 enables a user to access help for the order entry ticket. Button 505 enables a user to close the dialog without taking action. Title 506 indicates the title of the order entry ticket dialog. Action selector 507 enables a user to select an action for the order, which in this case is to sell the position. Quantity box 508 indicates the quantity of the position. Box 509 indicates type of the order (e.g., a "bracket stop limit" order). Text 510 indicates the message that explains the bracket order to the user. Icon 511 comprises an icon that helps distinguish the parts of the order. Box 512 comprises a drop-down box that enables a user to choose various types of trade automation for the order. In various embodiments, types of trade automation comprise Quote Trigger (e.g., trade executes when an instrument reaches a certain price), Fill Trigger (e.g., trade executes when another trade fills), One Cancels Other (e.g., two orders are placed but as soon as one fills the other is canceled), or any other appropriate trade automation. Account 513 comprises the account number the order will be placed from. Description 514 comprises a description of the strategy the order is for, where "SBUX" indicates the underlying security is Starbuck stock, "Sep09": indicates the expiration of the strategy, "19/20" indicates the strike prices of the strategy and "call vertical" indicates the name of the strategy. Description 515 comprises a description of the first component of the order which is to sell 10 of the Sep. 2009 19 strike Starbucks calls. Description 516 comprises a description of the second component of the order which is to buy 10 of the Sep. 2009 20 strike Starbucks calls. Box 517 displays a limit price of the order or enables a user to enter a limit price. Box 518 displays a bid-offer range the strategy is trading in at the current moment. Icon 519 comprises an icon indicating the risk profile of the strategy. Box 520 displays a stop limit price or enables a user to enter a stop limit price of the order. Box 521 displays a stop trigger price or enables a user to enter a stop trigger price of the order. Button 522 is a button enabling a user to cause the order to be saved for sending at a later time. Box 523 comprises a drop-down box enabling a user to specify time in force, or how long the order should be allowed to be active in the market. In various embodiments, time in force comprises a day, an hour, a week, a month, or any other appropriate length of time. Box 524 comprises a drop-down box enabling a user to specify special handling for the order (e.g., All or None or Not Held or other special handling types). Button 525 comprises a button that when clicked will submit the order for confirmation. Once the user confirms the order it will then be active in the market.

FIG. 6 is a screen shot illustrating an embodiment of a dialog box for setting alerts created from the Strategy-based Exit Plan dialog. In the example shown, dialog 600 sets two alerts, one if the profit target criterion is satisfied and one if the stop loss criterion is satisfied. Title 601 comprises the title of the Alerts form for activating an alert. Dialog 600 displays and is pre-filled when the user clicks the Create Alerts button (e.g., button 229 of FIG. 2). Button 602 enables a user to access help content for this dialog. Button 603 enables a user to close the window without taking action. Title 604 comprises the title of the User Configuration dialog, of which Alerts is one section of that dialog. Tab 605 comprises a dialog box selector for specifying trade quantities. Tab 606 comprises a dialog box selector for specifying pop-up confirmations. Tab 607 comprises a dialog box selector for specifying themes. Tab 608 comprises a dialog box selector for specifying alerts, which is the currently chosen selection. Tab 609 comprises a dialog box selector for specifying external access information. Text 610 comprises the "Alert is for" text label. Description 611 comprises the description of the position the alert is being set for which in this case is a "call vertical" strategy. Box 612 enables a user to select a metric that will be monitored in the market to trigger the alert, in this example the parameter is the "mark" price which is the price halfway between the bid and offer as quoted in the market. In various embodiments, the metric comprises Bid, Ask, Last, Mark, or any other appropriate metric. Text 613 indicates the "Alert is for" text label. Description 614 comprises a description of the strategy, in this example a call vertical. Box 615 enables a user to select a metric that will be monitored in the market to trigger the alert, in this example the parameter is the "mark" price which is the price halfway between the bid and offer as quoted in the market. Note 616 comprises a box enabling a user to write a note regarding the profit target alert, in this example the note has a default of "Profit Target." Box 617 enables a user to enter a value of the chosen metric, in this case the mark price, which will trigger the alert. Box 618 enables a user to enter the direction portion of the alert criteria which indicates the relationship between the metric (mark price in this example) and the value that will create the trigger. Note 619 comprises a box enabling a user to write a note regarding the stop loss alert, in this example the note has a default of "Stop Loss." Box 620 enables a user to enter a value of the chosen metric, in this case the mark price, which will trigger the alert. Box 621 enables a user to enter a direction portion of the alert criteria which indicates the relationship between the metric (mark price in this example) and the value that will create the trigger. Text 622 comprises a text label asking the user how to be notified when the alert triggers. Text 623 comprises check boxes where the user can elect to receive notification of the alert via a popup window or an email. Button 624 enables a user to cancel the alert. Button 625 enables a user to cancel the dialog and close the window without an action taking place. Button 626 enables a user to activate the alert. Button 627 enables a user to save all changes for the User Configuration dialog including changes to any alerts.

Figure 7:
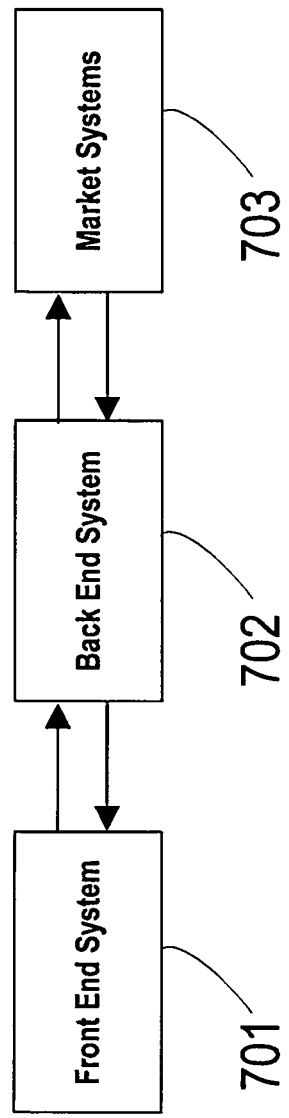
FIG. 7 is a diagram illustrating an embodiment of the high-level parts of a trading system.

FIG. 7 is a diagram illustrating an embodiment of a trading system. In the example shown, front end system 701 includes but is not limited to a user interface and components that support user interaction. Back end system 702 includes but is not limited to mechanisms for storage and retrieval of user and account data as well as systems for storing historical market data and performing analytic calculations. Market systems 703 include but are not limited to quote systems and order execution systems. In various embodiments, front end system 701, back end system 702, market systems 703 each comprise a server, a computer system, a single processor system, a multiprocessor system, one or more physical systems, a portion of a single system, a virtual system, a system including a memory and processor, or any other appropriate computer hardware and/or software. In various embodiments, a user accesses the system using a computer system, a mobile system, a network attached system, a wireless attached system, a cell phone attached system or device, a browser, or any other appropriate hardware and/or software for accessing the trading system.

Figure 8:
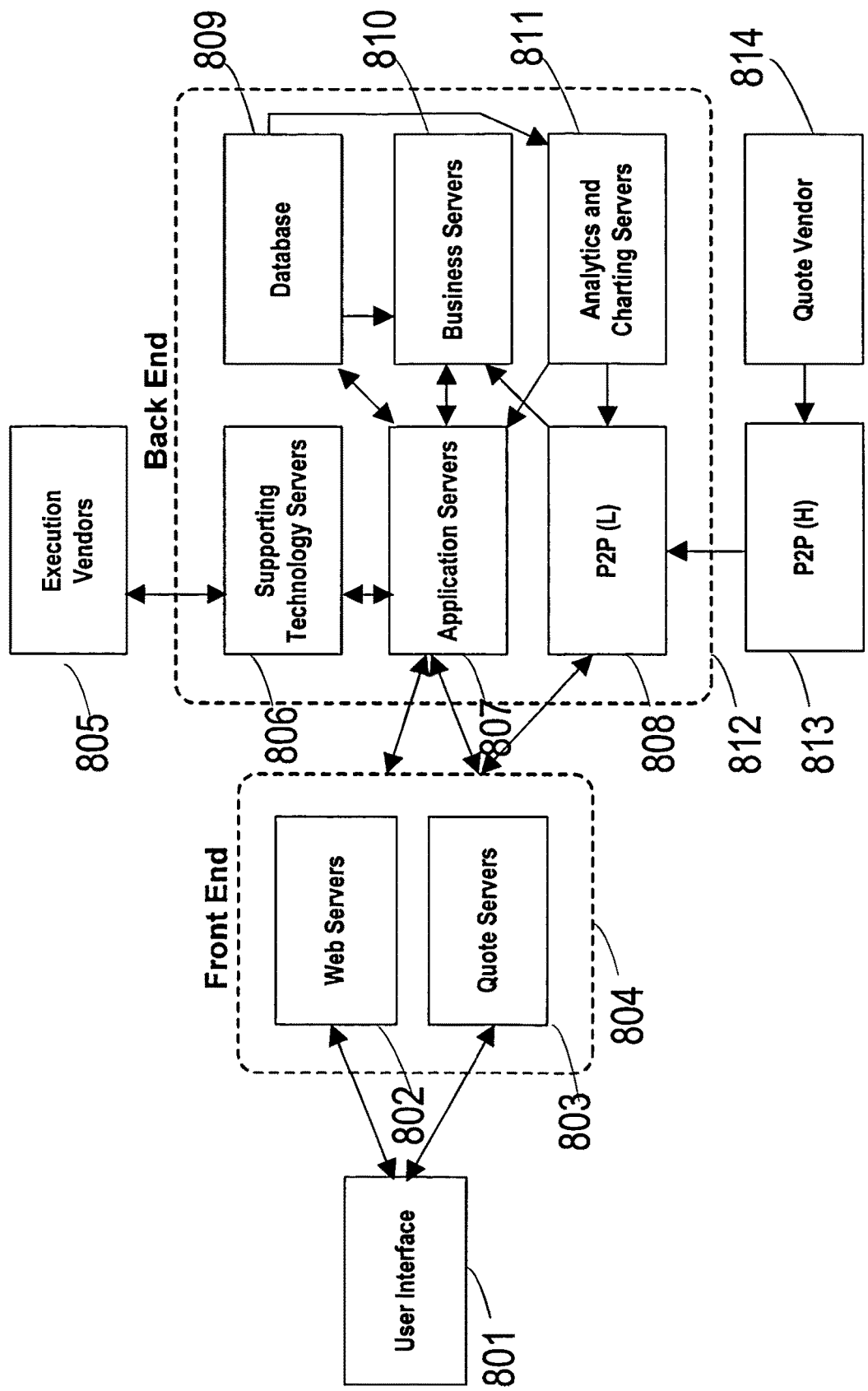
FIG. 8 is a flow diagram illustrating an embodiment of the high-level components of the trading system that facilitates Strategy-based Exit Planning.

FIG. 8 is a flow diagram illustrating an embodiment of a trading system. In the example shown, trading system includes user interface 801, front end 804, and back end 812. Front end 804 includes web servers 802 and quote servers 803. Quote servers 803 stream market data to the user interface. Execution Vendors 805 fill orders in the market from users as relayed via front end 804 and back end 812. Back end 812 includes Supporting Technology Servers 806; Application Servers 807, which provide application functions and services; P2P(L) 808, a peer to peer market data source; Database 809, which stores all user data including but not limited to positions, orders, strategy groupings, exit plans and balances; Business Servers 810; Analytics and Charting Servers 811, whose functions include providing risk metrics for positions and price charts; P2P(H) 813 comprises a market data source. Quote Vendor 814 is the source for market price quotes.

Figure 9:
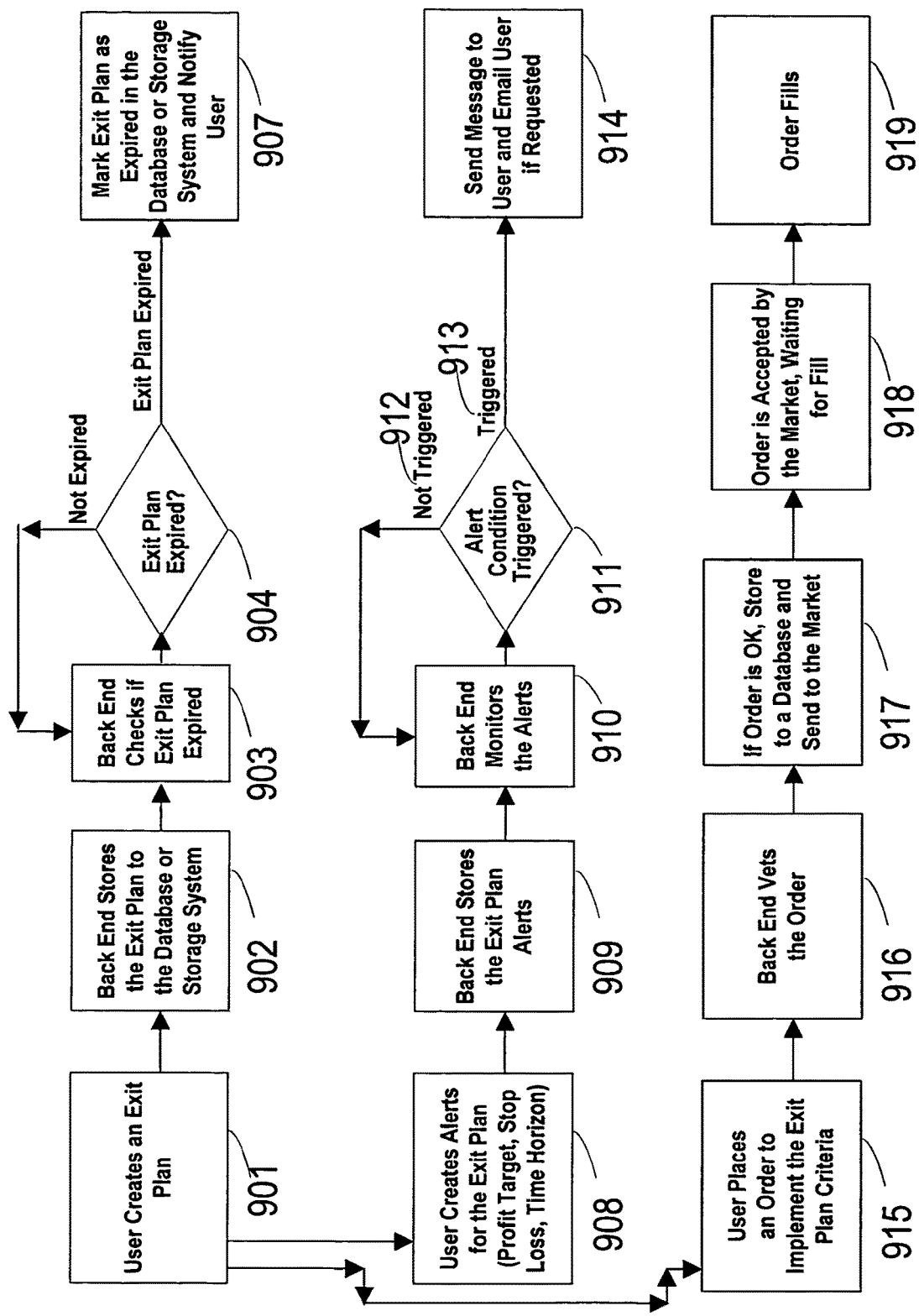
FIG. 9 is a flow diagram illustrating an embodiment of the processes of Strategy-based Exit Planning.

FIG. 9 is a flow diagram illustrating an embodiment of a process for Strategy-based Exit Planning In the example shown, in 901 a user creates an Exit Plan. In 902, the back-end system stores the Exit Plan to the database or storage system. In 903, the back-end system checks if the Exit Plan has reached its expiration date. In 904, it is determined whether the Exit Plan has expired or not. In the event that the Exit Plan has not expired, then the back end continues monitoring for expiration and control passes to 903. In the event that the Exit Plan has expired, in 907 the Exit Plan is marked as expired in the database or storage system and the user is notified. In 908, alerts are created based on the Exit Plan. In 909 the back-end system stores the exit plan alerts. In 910, the back-end system monitors the alerts to see if any of the alert conditions for profit target or stop loss have been triggered. In 911, it is determined whether an alert has triggered or not. In the event that no alert conditions have triggered, control passes to 910. In the event that an alert condition has triggered, in 914 the user is sent a message that an alert has triggered and also the user is sent an email stating an alert has triggered if the user elected to have an email sent. In 915, the user places an order that will cause the position to be closed if either the profit target or stop loss conditions are met. This type of order, called a "bracket" order comprises two separate orders, one for the profit target and one for the stop loss, that are bundled together such that if one fills the other gets automatically cancelled. In 916, the back end vets the order, or verifies that the order is suitable to send to the market. In 917, the order is stored to the database or storage system. In 918 the order is accepted by the market and waits to be filled. In 919 the order is filled.

Figure 10:
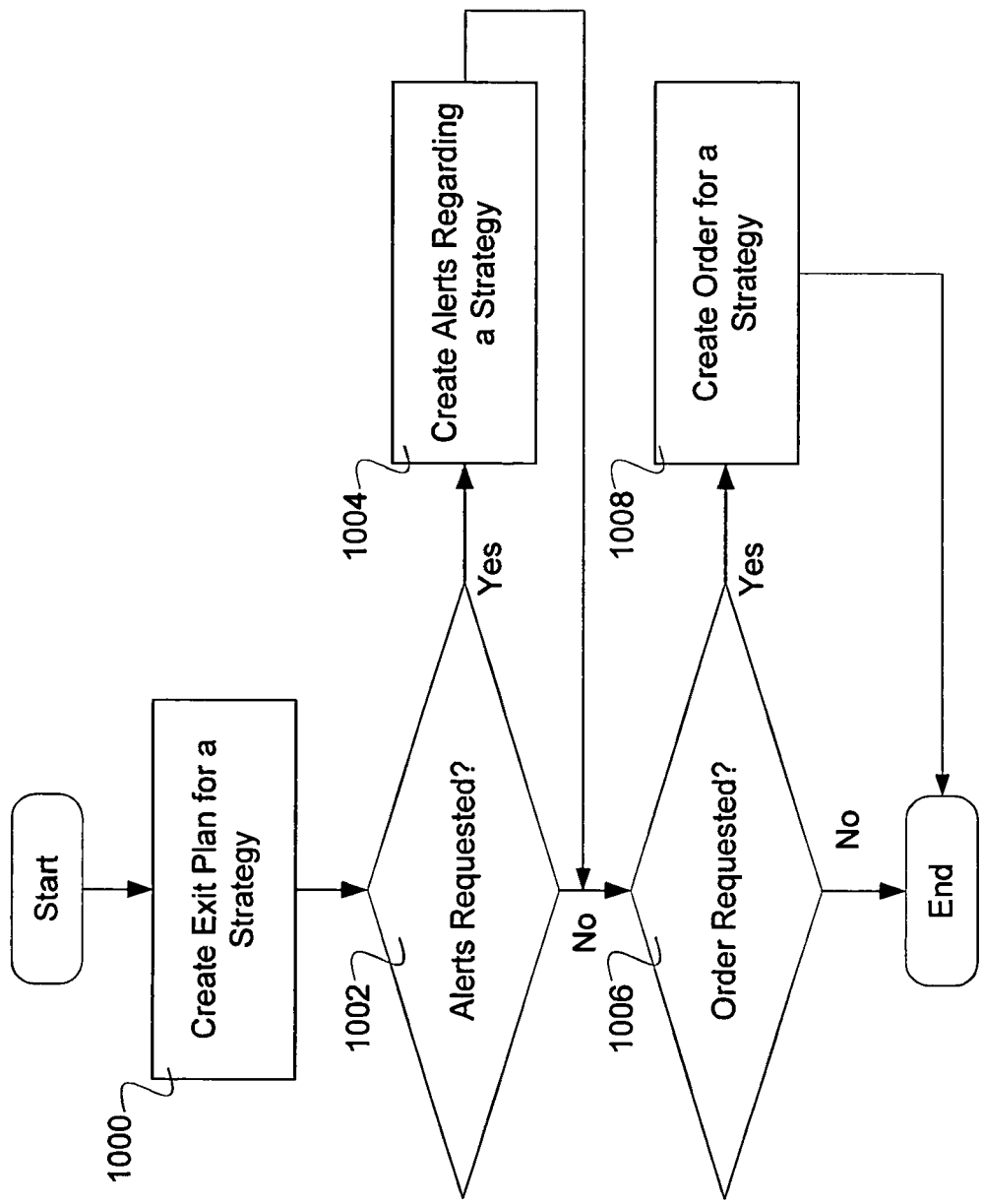
FIG. 10 is a flow diagram illustrating an embodiment of a process for Strategy-based Exit Planning including the creation of alerts and orders from the exit plan.

FIG. 10 is a flow diagram illustrating an embodiment of a process for strategy-based exit planning. In the example shown, in 1000 an exit plan is created for a strategy. In 1002, it is determined whether an alert is requested. In the event that an alert is requested in 1004 alerts regarding a strategy are created, and control passes to 1006. In the event that an alert is not requested, control passes to 1006. In 1006, it is determined whether an order is requested. In the event that an order is requested, in 1008 an order is created for a strategy and the process ends. In the event that an order is not requested, the process ends.

Figure 11:
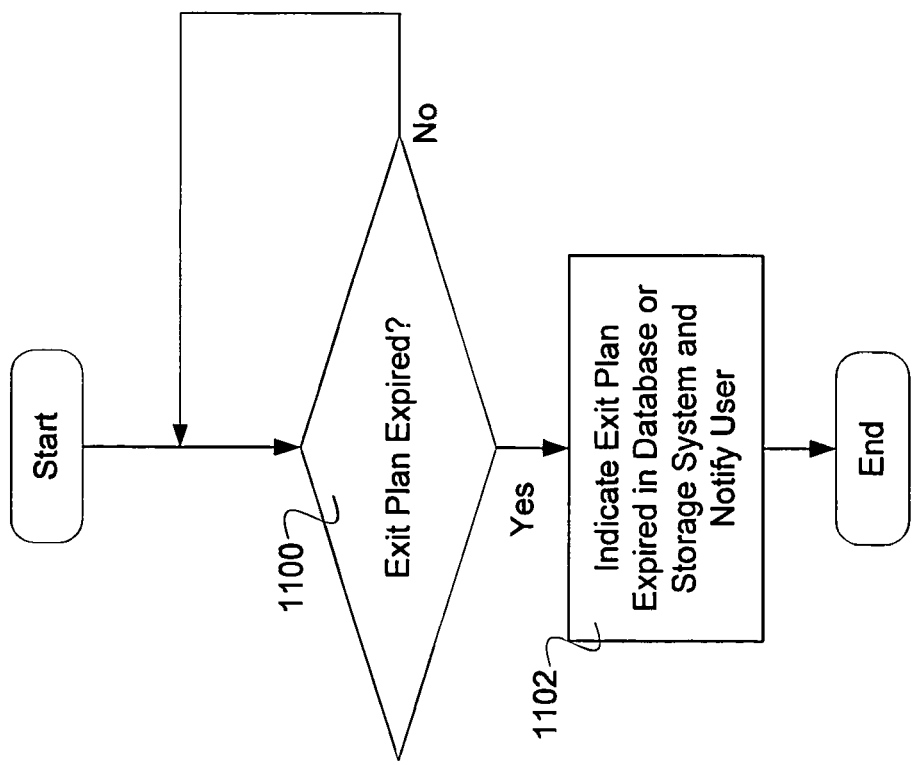
FIG. 11 is a flow diagram illustrating an embodiment of a process for a Strategy-based Exit planning system that shows monitoring the Exit Plan for expiration and indication of expiration.

FIG. 11 is a flow diagram illustrating an embodiment of a process for a strategy-based exit planning system. In some embodiments, the process of FIG. 11 is used for executing after an exit plan is created and stored. In the example shown, in 1100 it is determined whether an exit plan has expired. In the event that an exit plan has expired, then in 1102 the exit plan is indicated as expired in a database or storage system and the user is notified.

Figure 12:
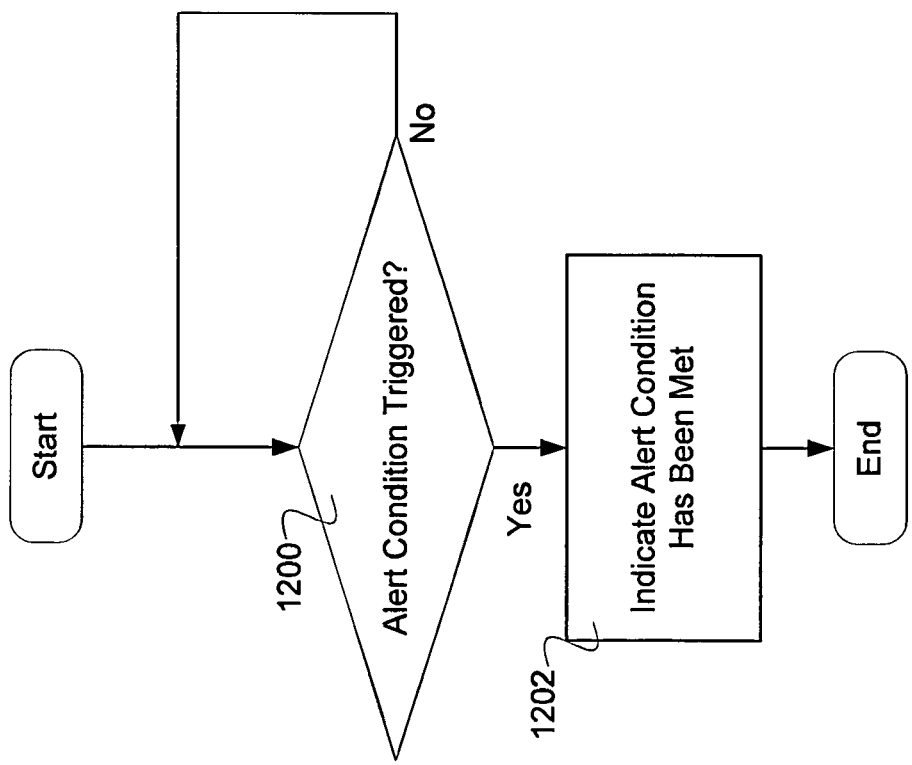
FIG. 12 is a flow diagram illustrating an embodiment of a process for a Strategy-based Exit Planning system that shows monitoring Alerts for fulfilled conditions and indication of fulfilled conditions.

FIG. 12 is a flow diagram illustrating an embodiment of a process for a strategy-based exit planning system. In some embodiments, the process of FIG. 12 is used for executing after an alert is created and stored. In the example shown, in 1200 it is determined whether an alert condition has been triggered. In the event that the alert condition has not been triggered, control passes back to 1200. In the event that the alert condition has been triggered, in 1202 it is indicated that an alert condition has been met. In various embodiments, the indication comprises a pop-up reminder, an email, a text message, a twitter, a phone text message, a beeper message, or any other appropriate indication.

Figure 13:
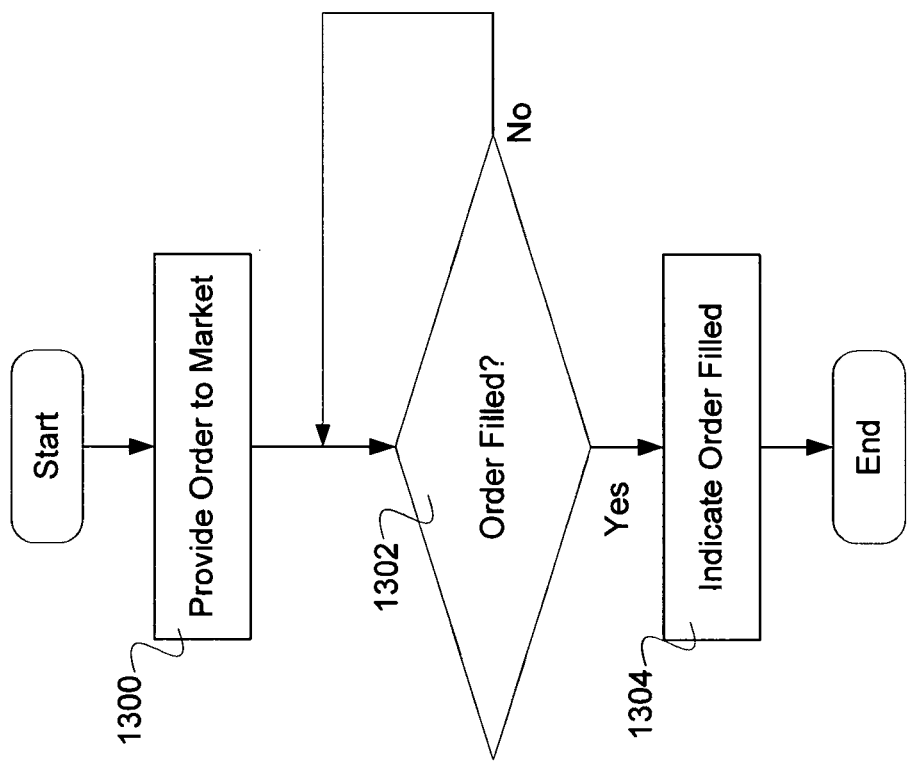
FIG. 13 is a flow diagram illustrating an embodiment of a process for a Strategy-based Exit Planning system that shows providing an order, monitoring for a fill and indication of a filled order.

FIG. 13 is a flow diagram illustrating an embodiment of a process for a strategy-based exit planning system. In some embodiments, the process of FIG. 13 is used for executing after an order is created and stored. In the example shown, in 1300 an order is provided to a market. In 1302, it is determined whether the order has been filled. In the event that the order has not been filled, control passes back to 1302. In the event that the order has been filled, it is indicated that the order has been filled, and the process ends.

Figure 14:
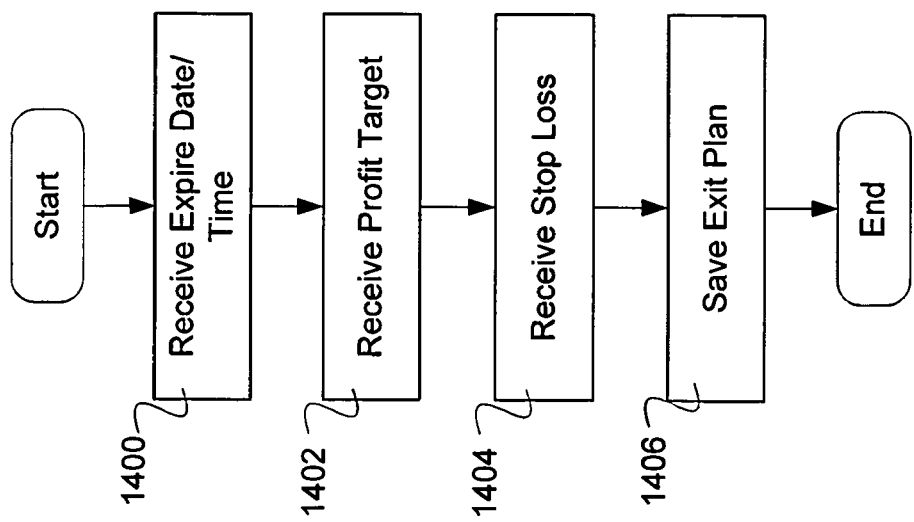
FIG. 14 is a flow diagram illustrating an embodiment of a process for creating an exit plan.

FIG. 14 is a flow diagram illustrating an embodiment of a process for creating an exit plan. In some embodiments, the process of FIG. 14 is used to implement 1000 of FIG. 10. In the example shown, in 1400 an expire date/time is received. In 1402, a profit target is received. In 1404, a stop loss is received. In 1406, the exit plan is saved. In various embodiments, the exit plan is saved using a database, using a storage system, or any other appropriate manner of saving an exit plan.

Figure 15:
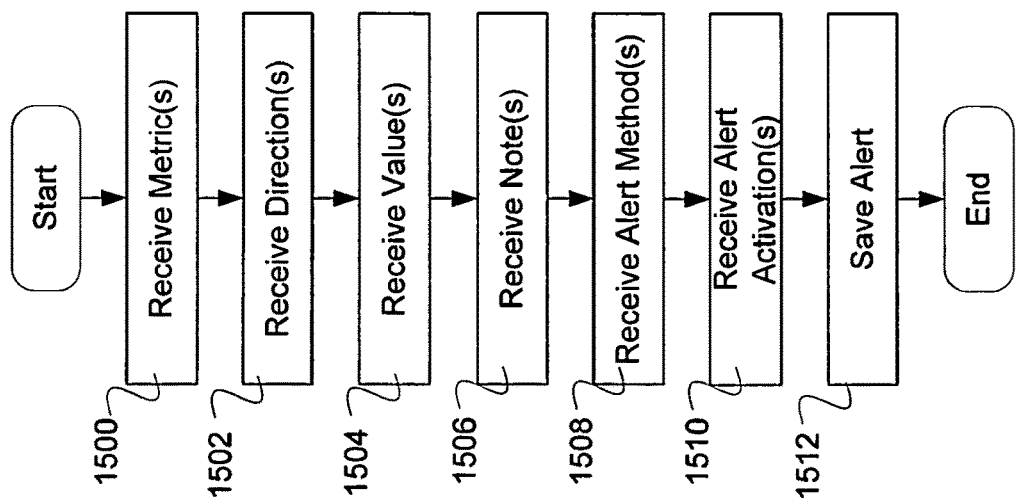
FIG. 15 is a flow diagram illustrating an embodiment of a process for creating an alert.

FIG. 15 is a flow diagram illustrating an embodiment of a process for creating an alert. In some embodiments, the process of FIG. 15 is used to implement 1004 of FIG. 10. In the example shown, in 1500, one or more metrics is/are received. In 1502 one or more directions is/are received. In 1504, one or more values is/are received. In 1506, one or more notes is/are received. In 1508, one or more alert methods is/are received. In 1510, one or more alert activations is/are received. In 1512, an alert is saved.

Figure 16:
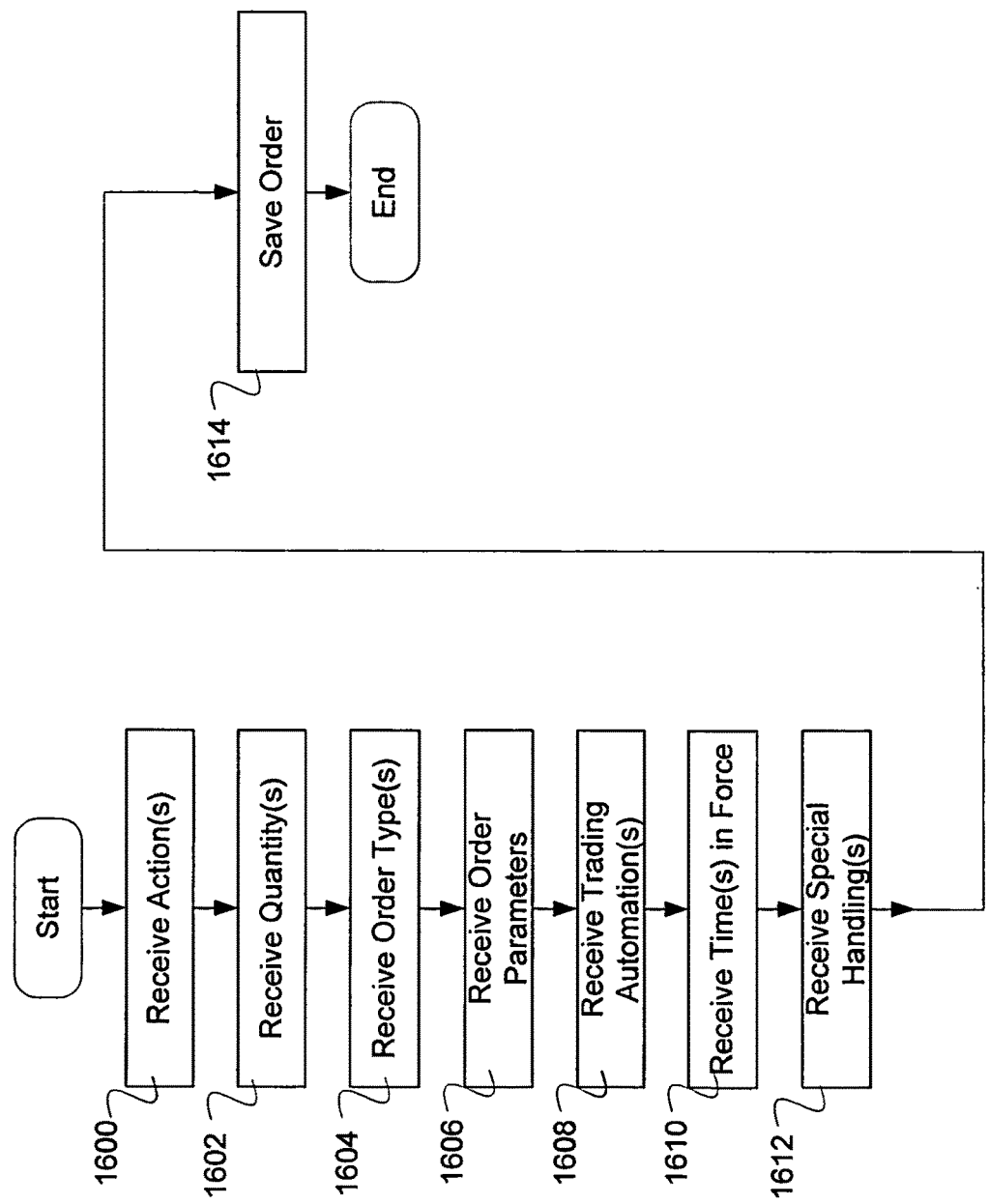
FIG. 16 is a flow diagram illustrating an embodiment of a process for creating an order.

FIG. 16 is a flow diagram illustrating an embodiment of a process for creating an order. In some embodiments, the process of FIG. 16 is used to implement 1008 of FIG. 10. In the example shown, in 1600 one or more actions is/are received. In 1602, one or more quantities is/are received. In 1604, one or more order types is/are received. In 1606, one or more order parameters is/are received. In 1608, one or more trading automations is/are received. In 1610, one or more times in force is/are received. In 1612, one or more special handlings is/are received. In 1614, an order is saved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for generating an order entry via a user interface, the system comprising:
   a processor coupled with a memory and with an exchange via a communications network and configured, based on instructions stored in the memory, to:
   present, on a display coupled with a processor, the user interface coupled with the processor for interaction with a user;
   receive, via the user interface, an indication that the user has selected to specify an exit plan for a position;
   present, on the display, a strategy-based exit plan dialog comprising at least a profit target and a stop loss;
   receive, via the user interface, in a single entry, a value of either a target price level, a change from a price paid, a percentage change from the price paid or a desired gain or maximum allowed loss, wherein the profit target and/or the stop loss is set using a profit target calculator that is configured to compute the profit target and/or the stop loss, and wherein once any one of the values is specified, the other three values are automatically calculated and displayed via the user interface;
   receive, via the user interface, a user selection of an indication to create the order entry based on the profit target and/or the stop loss; and
   automatically generate an order entry ticket created from the strategy-based exit plan dialog and submit data from the order entry ticket to a back-end system coupled with the user interface, wherein the back-end system vets the data from the order entry ticket and sends the data from the order entry ticket to a market for entry.

2. The system of claim 1, wherein the order entry ticket contains a two-part bracket order comprising an order to exit the position if the profit target is satisfied and an order to exit the position if the stop loss is satisfied.

3. The system of claim 1, further comprising instructions to:
receive, in the strategy-based exit plan dialog via the user interface coupled with the processor, a user selection of an indication to invoke a profit target calculator to specify the profit target; and
present, via the user interface, the profit target calculator from which the user specifies the profit target using a plurality of data entry values.

4. The system of claim 1, further comprising instructions to:
receive, in the strategy-based exit plan dialog via the user interface coupled with the processor, a user selection of an indication to invoke a profit target calculator to specify the stop loss; and
present, via the user interface, the profit target calculator from which the user specifies the stop loss using a plurality of data entry values.

5. The system of claim 1, wherein the processor is configured to pre-fill and display, via the user interface, a plurality of fields for the strategy-based exit plan dialog comprising data relating to a plurality of parameters that define the order entry.

6. The system of claim 1, wherein the order entry is part of a strategy, the strategy comprising a combination of a subset of individual investment instruments held by the user, the subset of individual investment instruments being characterized by a relationship derived from their having been substantially simultaneously acquired by the user based on a combination of parameters of each of the individual investment instruments of the subset, wherein at least one of the subset of individual investment instruments comprises an option contract on a underlying investment instrument traded on a public exchange.

7. The system of claim 1, wherein the order entry comprises a call option contract, a put option contract, a stock, a mutual fund, a future, or an exchange traded fund.

8. The system of claim 1, further comprising instructions to:
receive, via the user interface, a user selection of an indication to create an alert for the order entry.

9. A computer implemented method for generating an order entry via a user interface, the method comprising:
presenting, on a display coupled with a processor, the user interface coupled with the processor for interaction with a user;
receiving, via the user interface, an indication that the user has selected to specify an exit plan for a position;
presenting, on the display, a strategy-based exit plan dialog comprising at least a profit target and a stop loss,
receiving, via the user interface, in a single entry, a value of either a target price level, a change from a price paid, a percentage change from the price paid or a desired gain or maximum allowed loss, wherein the profit target and/or the stop loss is set using a profit target calculator that is configured to allow the user to specify the value of either the target price level, the change from the price paid, the percentage change from the price paid or the desired gain or maximum allowed loss, wherein, once any one of these values is specified, the other three values are automatically calculated and displayed via the user interface;
receiving, via the user interface, a user selection of an indication to create the order entry based on the profit target and/or the stop loss; and
automatically generating an order entry ticket created from the strategy-based exit plan dialog and submitting data from the order entry ticket to a back-end system coupled with the user interface, wherein the back-end system vets the data from the order entry ticket and sends the data from the order entry ticket to a market for entry.

10. The computer implemented method of claim 9, wherein the order entry ticket contains a two-part bracket order comprising an order to exit the position if the profit target is satisfied and an order to exit the position if the stop loss is satisfied.

11. The computer implemented method of claim 9, further comprising:
receiving, in the strategy-based exit plan dialog via the user interface coupled with the processor, a user selection of an indication to invoke a profit target calculator to specify the profit target; and
presenting, via the user interface, the profit target calculator from which the user specifies the profit target using a plurality of data entry values.

12. The computer implemented method of claim 9, further comprising:
receiving, in the strategy-based exit plan dialog via the user interface coupled with the processor, a user selection of an indication to invoke a profit target calculator to specify the stop loss; and
presenting, via the user interface, the profit target calculator from which the user specifies the stop loss using a plurality of data entry values.

13. The computer implemented method of claim 9, wherein the processor is configured to pre-fill and display, via the user interface, a plurality of fields for the strategy-based exit plan dialog comprising data relating to a plurality of parameters that define the order entry.

14. The computer implemented method of claim 9, wherein the order entry is part of a strategy, the strategy comprising a combination of a subset of individual investment instruments held by the user, the subset of individual investment instruments being characterized by a relationship derived from their having been substantially simultaneously acquired by the user based on a combination of parameters of each of the individual investment instruments of the subset, wherein at least one of the subset of individual investment instruments comprises an option contract on a underlying investment instrument traded on a public exchange.

15. The computer implemented method of claim 9, wherein the order entry comprises a call option contract, a put option contract, a stock, a mutual fund, a future, or an exchange traded fund.

16. The computer implemented method of claim 9, further comprising:
receiving, via the user interface, a user selection of an indication to create an alert for the order entry.

17. A non-transitory computer program product for generating an order entry via a user interface, the computer program product being embodied in a computer readable storage medium and comprising computer instructions for:
presenting, on a display coupled with a processor, the user interface coupled with the processor for interaction with a user;
receiving, via the user interface, an indication that the user has selected to specify an exit plan for a position;
presenting, on the display, a strategy-based exit plan dialog comprising at least a profit target and a stop loss, wherein the profit target and/or the stop loss is set using a profit target calculator that is configured to allow the user to specify a value of either a target price level, a change from a price paid, a percentage change from the price paid or a desired gain or maximum allowed loss, wherein, once any one of these values is specified, the other three values are automatically calculated and displayed via the user interface;

receiving, via the user interface, a single entry of a user selection of the value of either the target price level, the change from the price paid, the percentage change from the price paid or the desired gain or maximum allowed loss and an indication to create the order entry based on the profit target and/or the stop loss; and automatically generating an order entry ticket created from the strategy-based exit plan dialog and submitting data from the order entry ticket to a back-end system coupled with the user interface, wherein the back-end system vets the data from the order entry ticket and sends the data from the order entry ticket to a market for entry.

18. The non-transitory computer program product of claim 17, wherein the order entry ticket contains a two-part bracket order comprising an order to exit the position if the profit target is satisfied and an order to exit the position if the stop loss is satisfied.

19. The non-transitory computer program product of claim 17, further comprising computer instructions for:

receiving, in the strategy-based exit plan dialog via the user interface coupled with the processor, a user selection of an indication to invoke a profit target calculator to specify the profit target; and presenting, via the user interface, the profit target calculator from which the user specifies the profit target using a plurality of data entry values.

20. The non-transitory computer program product of claim 17, further comprising computer instructions for:

receiving, in the strategy-based exit plan dialog via the user interface coupled with the processor, a user selection of an indication to invoke a profit target calculator to specify the stop loss; and presenting, via the user interface, the profit target calculator from which the user specifies the stop loss using a plurality of data entry values.

21. A system comprising:

a processor coupled with a memory and with an exchange via a communications network and configured, based on instructions stored in the memory, to:

present, on a display coupled with a processor, the user interface coupled with the processor for interaction with a user;

receive, via the user interface, an indication that the user has selected to specify an exit plan for a position;

present, on the display, a strategy-based exit plan dialog comprising at least a profit target and a stop loss, wherein the profit target and/or the stop loss is automatically set based on a user specification of one of a value of either a target price level, a change from a price paid, a percentage change from the price paid or a desired gain or maximum allowed loss, wherein, the unspecified others of the target price level, the change from a price paid, the percentage change from the price paid or the desired gain or maximum allowed loss are automatically calculated and displayed via the user interface;

receive, via the user interface, in a single entry of a user selection of the value of either the target price level, the change from the price paid, the percentage change from the price paid or the desired gain or maximum allowed loss and an indication to create the order entry based on the profit target and/or the stop loss;

automatically generate a two part bracket order comprising a first order to exit the position if the profit target is satisfied and a second order to exit the position if the stop loss is satisfied, wherein execution of one of the first or second order automatically cancels the other of the first and second orders;

automatically generate an order entry ticket created from the strategy-based exit plan dialog for the order entry and comprising the two part bracket order; and receive, via the user interface, a user selection of an indication to accept the order entry ticket and based thereon, submit the two part bracket order to a back-end system coupled with the user interface to await execution, the back-end system operative to monitor an electronic market and, based thereon, execute one of the first and second orders and cancel the other of the first and second orders.

* * * * *